United States Patent

Brenner

[15] 3,697,870

[45] Oct. 10, 1972

[54] DIGITALLY NULLED MAGNETIC DETECTION SYSTEM

[72] Inventor: Leonard C. Brenner, Falls Church, Va.

[73] Assignee: Burroughs Corporation, Detroit, Mich.

[22] Filed: Sept. 24, 1971

[21] Appl. No.: 183,566

[52] U.S. Cl. .................................................324/43 R
[51] Int. Cl. ..............................................G01r 33/02
[58] Field of Search..........324/43 R, 47, 105 R, .5 E, 324/8

[56] References Cited

UNITED STATES PATENTS 3,443,213  5/1969  Bader et al................324/43 R
3,622,873  11/1971  Stein........................324/43 R Primary Examiner—Robert J. Corcoran
Attorney—Edward J. Feeney, Jr.

[57] ABSTRACT

Digital ambient nulling techniques are applied to a magnetometer sensor to provide high sensitivity magnetic detection with minimum circuit and system complexity. The system performs an automatic cancellation of the comparatively large steady-state earth's magnetic field to permit the sensing of very small magnitude, very low frequency signal information. Such cancellation of the earth's field effects is accomplished by means of an electronically controlled incremental null voltage.

8 Claims, 6 Drawing Figures

INVENTOR.
LEONARD C. BRENNER

DIGITALLY NULLED MAGNETIC DETECTION SYSTEM

CROSS REFERENCES TO RELATED APPLICATIONS

In copending application Ser. No. 148,796 for "Magnetometer Sensor Digital Ambient Nulling System" filed in the name of Richard L. Fussell, there are described and claimed several embodiments of a digital ambient nulling system. Although not limited thereto, the present system for digital ambient nulling may be applied to the thin magnetometer sensors described and claimed in: (1) Ser. No. 691,901, which is U. S. Pat. No. 3,518,534, "Magnetometer Employing Dual Thin Magnetic Film Transducers" by Clifford J. Bader, and (2) Ser. No. 543,097, now U. S. Pat. No. 3,443,213, "Magnetometer Using Thin Film Transducer as Slope Detection Filter" by Clifford J. Bader, Richard L. Fussell and Arthur G. Barnett. Each of these patents and the aforementioned application are assigned to the same assignee as the present invention.

BACKGROUND OF THE INVENTION

Thin film magnetometer sensors of the type described in the reference patents are often employed in high sensitivity, remote emplacement, magnetic anomaly applications. A fundamental problem in the operation of such sensors is the need to separate the effect of the steady state earth's magnetic field which is of the order of $\pm 0.6$ oersted, from the signal information which may be less than $10^{-3}$ oersted and which may have a frequency of less than 0.1 hz. The problem is essentially the same in the two basic modes of operation of the thin film sensor when combined with an operational amplifier. Such operation involves either magnetic (current mode) or voltage mode feedback.

The closed-loop output voltage for the two modes is a function of the steady-state field and the time-varying field of interest. In can be shown mathematically that the output voltage sensitivity includes both steady-state and time-varying terms where the steady-state term has a very much greater dynamic range. As a result the maximum sensitivity is constrained by the available dc supply voltage and the maximum magnetic ambient field amplitude expect to be encountered during operation. Utilizing typical design parameters, it has been found in many practical situations that the time-varying anomaly signal level is too small, by at least an order of magnitude, to be detected and processed without additional amplification. On the other hand, additional dc amplification is restricted by the same voltage limits as the initial sensitivity factors and cannot be employed.

Previous solutions to the foregoing problem, where the time-varying small-signal gain is limited by ambient field magnitude and practical power supply voltage levels, have made use of integrating networks and ac coupling. In both cases the basic feature is the use of very long time constant networks which permit increased gain factors for very low frequency (less than 0.1 hz) information signals with minimal response to the ambient field steady-state effect. However, because of the very low frequency signals and resultant very long network time constants, a number of practical design, volume and cost constraints are created in connection with the linear network solutions.

The disadvantages of the network approach will be apparent from the following. Assuming typical operating parameters for the sensor wherein the maximum ambient field is $\pm 0.5$ oersted and the dc voltage levels are $\pm 5$ volts, the maximum permissible dc sensitivity for the output voltage is 10 volts/oersted, which is 1 millivolt/$10^{-4}$ oersted. With a minimum signal detection voltage requirement of 10 millivolts for the $10^{-4}$ oersted signal, it follows that ac amplification or gain boost of 10:1 must be incorporated for the 0.1 hz minimum signal frequency. Furthermore to prevent undue phase shift, the nearest single time constant network break frequency should be at or below 0.01 hz which is at least one decade removed from the minimum signal frequency.

Under these conditions, the required long RC time constant can be realized only by low-leakage capacitors on the order of tens of microfarads and stable, low noise resistors having megohm resistance values. Practical hardware thus requires relatively expensive, bulky, non-ideal network resistors and capacitors, and imposes additionally demanding requirements on the associated amplifiers for very high input impedance, very low input bias currents, very low input offset voltages and very low input noise currents. As to the use of large value resistors, the problem is complicated since metallic resistors generate noise in the form of spontaneous voltage fluctuations. Due to the extremely low level sensor output signals, the maximum value of the network resistors than can be successfully employed, is limited by noise considerations.

An additional problem created by the time constants associated with the linear networks is the need in many applications for rapid stabilization characteristics at initial system emplacement and after severe physical disturbances where the ambient magnetic field level is greatly altered as a result of the physical re-orientation of the sensor. With the use of the very long time constant networks described hereinbefore, the approach has been to provide switching devices that effectively reduce the resistance value of the resistors to permit rapid capacitor charge or discharge to the new, or initial, steady-state voltage conditions. Obviously, such a solution entails the use of special devices and control circuits. Moreover, the transition between short and long time-constant network conditions can create spurious analog effects. In order to keep such effects within tolerable operating limits, additional constraints on capacitor leakage, amplifier parameters and switch devices are created.

Another general solution to the basic problem of elimination or minimization of the ambient field constraint on sensor output dynamic range and sensitivity is that provided by an adjustable cancelling or nulling voltage. The latter may be employed either in a current mode feedback system in which the mulling voltage is converted to a current, or in a voltage mode feedback system. In either system, the sensor output may be manually adjusted, by way of the null voltage level setting, to be close to a consistent reference voltage level well within system voltage range limits, while directly providing as large an output sensitivity as may be required for subsequent signal detection circuit operation. The output signal conditions are independent of the steady-state ambient magnetic field and the ambient influence is absorbed by the independent null voltage conditions.

The manual system may be physically implemented by the use of mechanical devices such as low impedance potentiometer or an adjustable voltage supply. However, it is readily apparent that such equipment is totally inappropriate for compact, battery powered, remote operation equipments.

In the present invention and the referenced application, there are described and claimed various circuit configurations of a non-manual, non-mechanical digital nulling system. These configurations are believed to be the most practical solution to high sensitivity magnetic detection systems designed.

The magnetometer system of the present invention differs from that of the referenced copending application in the following significant respects. The magnetometer sensor is totally isolated from the digital nulling feedback path. Thus, the techniques taught herein are not constrained to the magnetic thin film type of sensor described in the referenced patents. The digital nulling technique is applicable to other types of magnetic transducers such as the flux-gate type, and is also suitable for use in other applications, as for example, those employing infrared sensors and other signal sources. Another significant feature of the present invention is the use of a special comparator circuit to minimize circuit and system complexity. Finally, the system may be used to provide signal amplitude discrimination.

SUMMARY OF THE INVENTION

The system described herein incorporates a voltage mode feedback sensor and a digital ambient nulling technique using voltage band correction. Important elements of the system include a sensor amplifier, comparator, ripple counter, and a digital-to-analog (D/A) converter.

In operation, the output of the magnetometer sensor is applied to an input terminal of an amplifier designed to provide suitable gain. If the amplifier output strays outside of the voltage limits set by the comparator parameters due to ambient magnetic field constraints or any other reason, the comparator recognizes this condition and initiates a null cycle by energizing a digital clock. The latter provides clock pulses which are applied to the counter input terminal. The counter advances successively in response to the clock pulses. The counter output terminals are coupled to the D/A resistor summing network. The output voltage of the summing network is fed through a buffer amplifier to one of the sensor amplifier input terminals. The clock continues to run until the amplifier output voltage level is brought back to a predetermined reference level, which may be approximately one half of the supply voltage. The comparator then senses that the amplifier has been nulled and stops the clock, thereby ending the null cycle.

The system configuration and operational details given above have been presented in simplified form. Other features of the invention will become more fully apparent in the detailed description presented hereinafter.

DESCRIPTION OF THE PREFERRED EMBODIMENT

Figure 1:
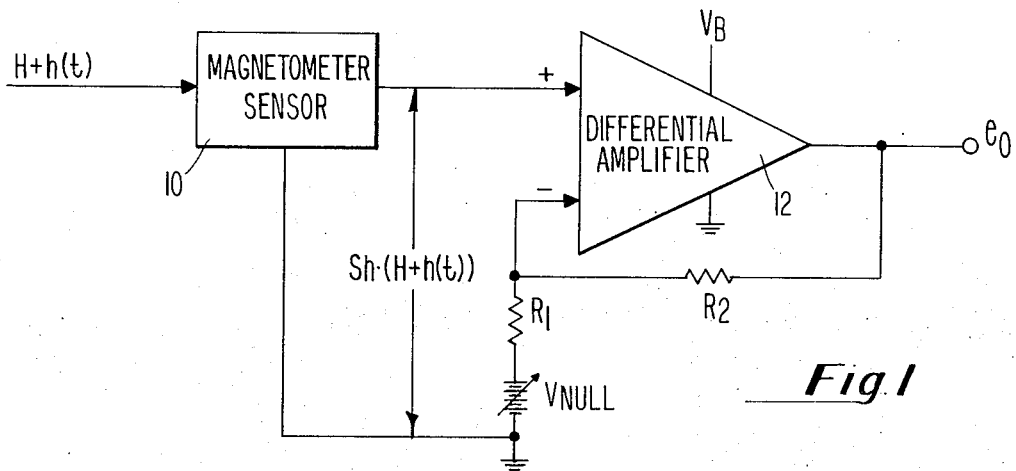
FIG. 1 is a diagram depicting a voltage mode feedback sensor with ambient nulling.

FIG. 1 illustrates the basic technique of ambient nulling applied to a voltage mode feedback sensor 10. The output of the sensor is applied to a first input terminal of differential amplifier 12. The system sensitivity which may be expressed in volts/oersteds is determined by multiplying the basic magnetometer sensitivity ($S_h$) by the closed loop gain of the amplifier 12. The last mentioned gain is essentially the ratio of the feedback resistor $R_2$, divided by the input resistor, $R_1$. The magnetometer sensor output will contain voltage information about the earth's ambient field, H, as well as the desired information about the magnetic anomaly field $h(t)$. The earth's steady-state ambient field influence at the sensor output is cancelled or nulled by providing an adjustable nulling voltage, $V_{NULL}$. The sensor output may be adjusted, via the setting for $V_{NULL}$, to be close to a constant reference voltage, $E_{ref}$, which may be approximately equal to one half of the power supply voltage level, $V_B$. If a bi-polar power supply is used, $E_{ref}$ may be chosen as the ground or zero voltage level. This nulling technique provides as large an input sensitivity as may be required for subsequent signal detection circuit operation. The actual amplifier output signal, $e_o$, is independent of the steady-state ambient magnetic field as indicated by the equation:

$$e_o = -E_{ref} + S_h (R_2/R_1) h(t)$$

for $$V_{NULL} = E_{ref} + S_h \cdot H,$$

where $E_{ref}$ is approximately equal to the nominal amplifier output.

As indicated in FIG. 1, the null voltage, $V_{NULL}$, is applied to the second input terminal of differential amplifier 12, and is illustrated as being manually adjustable. The present invention provides automatic nulling by virtue of the system configuration depicted in FIG. 2.

Figure 2:
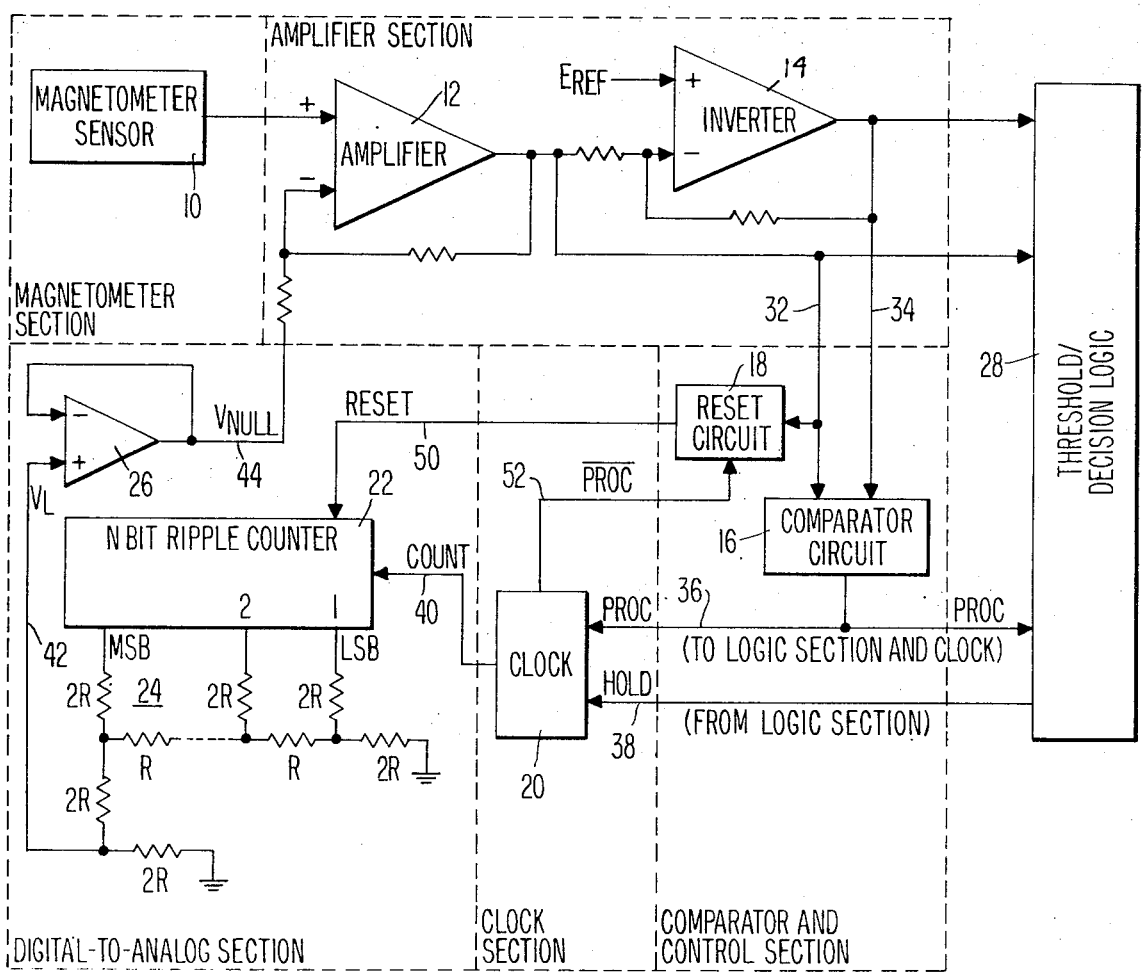
FIG. 2 is a diagram of the digital nulling system of the present invention.

FIG. 2 illustrates the combination of the magnetometer sensor 10 with the ambient null system of the present invention. As noted hereinbefore, the sensor may be of the thin magnetic film inductance variation types described in the referenced patents, although the invention is not limited to such types. The sensor is subjected to a magnetic field environment which includes the steady-state earth's field, H, and the time-varying field of interest, $h(t)$. The system is divided into five main sections, mainly, a Magnetometer Section comprising the sensor 10; an Amplifier Section including differential amplifier 12 and inverter 14; a Comparator and Control Section comprising comparator circuit 16 and reset circuit 18; a Clock Section including the source 20 of clock pulses; and a Digital to Analog Section comprising an "N" bit ripple counter 22, a resistance ladder 24 and an output buffer amplifier 26. It should also be mentioned that in an actual system, separate ladder drivers may be interposed between the counter 22 and the resistance ladder 24 if the driving function cannot be performed by the counter itself. The counter length comprising "N" bits (the most and least significant bits being designated respectively MSB and LSB) is dictated by the ambient field nulling range and the resolution requirement, that is, the magnitude of the least significant bit, which is in turn, dictated by the analog output small signal sensitivity.

Also shown in FIG. 2 is a functional block 28 entitled Threshold/Decision Logic. The amplified sensor signal appearing on the output terminal of amplifier 12 (and the minus (−) input terminal of inverter 14) and that appearing on the output terminal of inverter 14 are applied concurrently to logic block 28. The function of the Threshold/Decision Logic is to accept the amplified sensor output information and to provide by means of threshold switches an indication that a particular anomaly situation has occurred. This indication is processed by suitable decision logic to establish its validity. As will be apparent in the system operational description which follows, the Threshold/Decision Logic 28 also receives an indication from comparator circuit 16 that a null processing (PROC) cycle is in progress and may under certain circumstances where logic processing is occuring, inhibit a null operation through the use of a HOLD signal applied to the clock 20. The characteristics of the logic block 28 may take numerous forms depending upon the application of the sensor. The particular form of decision logic to be employed rests with, and is well within the skill of, the logical designer.

With reference to an actual operative embodiment of the invention, the system of FIG. 2 performs as follows. The sensitivity of the magnetometer sensor 10 may be assumed to be of the order of 1.5 volts/oersted. In the amplifier section, conventional micro-power linear integrated circuit operational amplifier technology is employed. The output of sensor 10 is coupled to the non-inverting plus (+) input terminal of sensor amplifier 12. This last amplifier increases the magnetometer sensitivity from 1.5 volts/oersted to approximately 300 volts/oersted. The output of amplifier 12 is coupled to the inverting minus (−) terminal of inverter 14. The plus (+) terminal of inverter 14 is coupled to $E_{ref}$, a source of reference potential. Inverter 14 which has a gain of −1 enables a push-pull output to be provided to the Threshold/Decision Logic 28 and to the comparator circuit 16.

Figure 3:
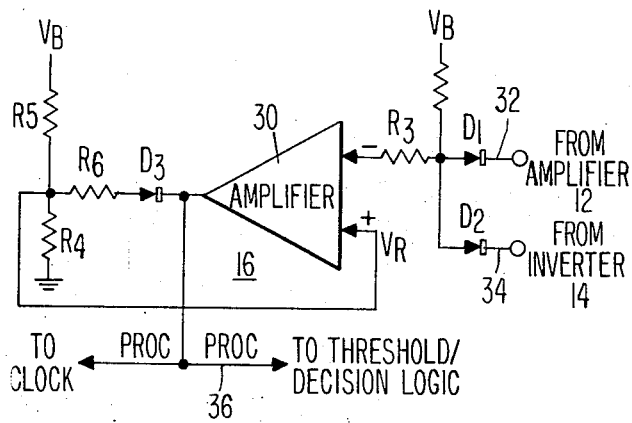
FIG. 3 is a schematic of the comparator and portions of the control section utilized in the system of FIG. 2.

With continued reference to FIG. 2 and specific reference to FIG. 3, the comparator 16 utilizes one operational amplifier 30 to perform all of the functions required for establishing a nominal reference, setting both high and low deviation limits, and controlling the digital nulling operation. The comparator circuit 16 functions in the following manner.

The push-pull amplified sensor signals appearing at the output of amplifier 12 and the output of inverter 14 appear respectively on lines 32 and 34 and are coupled via respective diodes $D_1$ and $D_2$ and common resistor $R_3$ to the minus (−) input terminal of amplifier 30. The output of comparator amplifier 30 is normally "low", that is, near zero volts. With a supply voltage $V_B$ of nominally 10 volts, a 1.6 volts reference level is placed on the plus (+) input of the amplifier 30 by the resistor divider network $R_4$, $R_5$ and $R_6$. Diode $D_3$ couples the output terminal of amplifier 30 to the resistor divider.

The comparator will remain in this normally low state so long as $V_R$ the reference voltage input to the minus (−) terminal of amplifier 30 remains above 1.6 volts. Assume that at initial emplacement and actuation of the sensor, or upon the subsequent occurrence of a gross ambient field change, the last mentioned voltage is, or becomes, less than 1.6 volts. In order for this to occur, the sensor amplifier 12 output on line 32, or the inverter 14 output on line 34 must drop below one volt since a voltage drop of approximately 0.6 volts occurs across each of the diodes $D_1$ and $D_2$. The output of inverter 14 fall, below 1.6 volts when the output voltage of amplifier 12 has risen above 9 volts since the inverter output follows the amplifier output with a gain of −1 centered around an $E_{ref}$ of 5 volts. Once the input to the negative terminal of comparator amplifier 30 goes below 1.6 volts, the amplifier output switches to its "high" state in which the output voltage level approaches that of the $V_B$ supply. This last action effects a circuit change involving the resistor divider network, $R_4$, $R_5$, and $R_6$, so that the comparator positive input reference level $V_R$ switches to 5.1 volts.

The "high" comparator output level appearing on the output terminal of amplifier 30, is applied by way of the PROC line 36 to both the Threshold/Decision Logic 28 to signal the start of the initial null (or renull) cycle and to the clock 20 to initiate the generation of clock pulses thereby. The latter action is constrained if the Threshold/Decision Logic generates a HOLD signal on line 38.

The clock pulses from source 20 are applied via line 40 to the COUNT terminal of counter 22 causing the latter to advance one bit position for each clock pulse. The information stored in the counter 22 at any given time represents an "N" bit parallel-binary signal. Each bit of the last-mentioned signal is connected directly (or through a corresponding ladder driver, not shown) to its associated resistor element in the ladder network 24. The voltage $V_L$ appearing on line 42 at the output of the ladder network 24 is applied to one of the input terminals of operational amplifier 26, the output of which, $V_{NULL}$ on line 44 is applied to the minus (−) input terminal of sensor amplifier 12.

The equivalent null voltage $V_{NULL}$ will increase one increment for each one bit increase in the counter 22 content. The clock pulses continue to cycle the D/A converter until the sensor amplifier output level (or the inverter output, as the case might be) is increased to above 4.5 volts. At this point, a signal larger than 5.1 volts will appear on the minus (−) terminal of comparator amplifier 30. This signal condition causes the latter amplifier to switch back to its "low" state, and the "low" output therefrom, which is approximately at ground level, appears on the PROC line 36. This "low"

level applied to clock 20 terminates the generation of additional clock pulses. Depending upon particular applications the comparator hysteresis, that is, the switch point between the high and low states, may easily be varied by changing the values of $R_4$, $R_5$, and $R_6$.

Thus far, in describing the operation of the nulling system of FIG. 2, only a brief mention has been made of the reset circuit 18. It should be noted that if it is desired to minimize system components at the expense of increased nulling time, the reset circuit 18 may be eliminated. Since the counter 22 is assumed to be unidirectional (as opposed to the up-down type), its summing network 24 output increases in small voltage increments with each clock pulse until the counter has reached its maximum count. The very next count resets the counter to its minimum count and reduces the network output from its maximum level to its minimum level.

When the renulling cycle has been initiated because the network output voltage was too low, the counter is allowed to start at its original level and count up to the proper level. When a lower network voltage level is called for, and the reset circuit 18 is not present, the counter must count up from its original level to its maximum level, and then up from its minimum level to the desired level. Reset circuit 18 eliminates the nulling time required by the last mentioned operation, by sensing the desired lower output voltage level, and effecting an immediate reset of the counter, whereby the counter must then only count up from its minimum level to the desired level.

Figure 4:
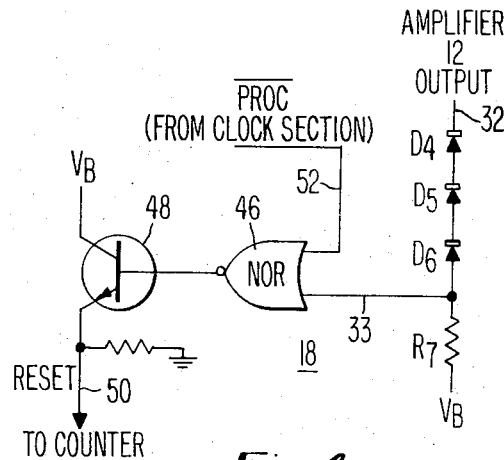
FIG. 4 is a schematic of a reset circuit which finds application in the control section of the system of FIG. 2.
Figure 5:
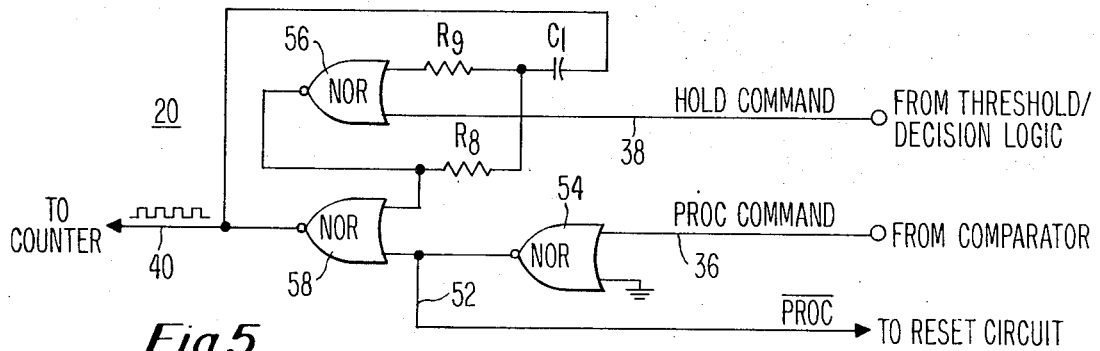
FIG. 5 is a schematic of a clock pulse source which may be utilized in the system of FIG. 2.

With specific reference to FIG. 4 and continued reference to FIG. 2, the reset circuit 18 comprises a logical NOR gate 46 (which may be of the MOS variety), and an output stage, transistor 48 connected as an emitter follower, which provides a reset pulse on RESET line 50 to counter 22 in the D/A section. A divider circuit including three diodes $D_4$, $D_5$ and $D_6$ and resistor $R_7$, interposed between the sensor amplifier 12 output on line 32 and NOR gate 46 provides the required dc level shift to reposition the amplifier 12 dynamic range around the NOR gate 46 input threshold switching point. The NOR gate 46 has a pair of input terminals, one of which is coupled to line 33 carrying the shifted amplifier 12 output and the other, coupled to receive a PROC signal on line 52, which is derived from NOR gate 54 (FIG. 5) in the clock section. The NOR gate 46 arrangement is such that both inputs thereto, namely a "low" level input as a result of the amplifier 12 output, and a "low" PROC input (as a result of the inversion of the "high" PROC signal in NOR gate 54, FIG. 5) causes the output of NOR gate 46 to be "high", which in turn causes the transistor 48 to conduct, and to generate a RESET pulse on line 50.

The instant that the counter 22 is reset, the summing network 24 output $V_L$ will be at a minimum and the sensor amplifier 12 output will be at a maximum (near 10 volts in an actual operative embodiment). This last voltage appearing on line 32 is applied after level shift to the NOR gate 46 causing the output thereof to become "low", and further causing transistor 48 to cease conduction. This terminates the RESET pulse on line 50 and the renulling cycle is then allowed to proceed. The clock 20 will supply COUNT pulses to the counter 20 via line 40 until the summing network 24 output level $V_L$ reaches the required voltage. At this time, $V_{NULL}$ will have reached its proper value, and the comparator circuit 16 senses that the amplifier 12 output is at the reference level. As described hereinbefore, the comparator 16 will switch back to its "low" state and stop the clock pulse output, thus completing the renulling cycle.

The clock circuit 20 may either be an internal component of the digital nulling system of FIG. 2 or may be external thereto. In an actual operating system, a 2 KHz COS/MOS logic clock, illustrated schematically in FIG. 5 was incorporated in the system. The clock itself is an astable multibrator including two COS/MOS inverters 56 and 58, a pair of resistors $R_8$ and $R_9$ and a capacitor $C_1$. An additional NOR gate 54 is required for logic purposes. This last gate receives as an input on line 36, the PROC command from the comparator 16, and provides as an output on line 52 a PROC signal to the reset circuit 18. The output of gate 54 is also applied to one of the input terminals of NOR gate 58.

In operation, assuming that a PROC command has been received by gate 54 to initiate the generation of clock pulses, and that no HOLD command is present from the Threshold/Decision Logic on line 38, the output of NOR gate 54 applied to NOR gate 58 causes the latter gate output to become "high". Capacitor $C_1$ coupled to the output of gate 58 is charged positively, that is, "high". As a result, the input to gate inverter 56 is "high" and its output is "low" or zero. Resistor $R_8$ is returned to the output of gate 56 to provide a path to ground for the discharge of capacitor $C_1$.

As long as the output of gate 56 is "low", the output of gate 58 is "high". As capacitor $C_1$ discharges, however, the voltage applied to one of the input terminals of gate 56 via resistor $R_9$ approaches and passes through the threshold voltage point of gate 56. The resistance of $R_9$ which is approximately twice that of $R_8$ renders the clock frequency insensitive to supply voltage variations. At the instant that the cross-over occurs, the output of gate 56 becomes "high". As a result, the output of gate 58 becomes "low" and capacitor $C_1$ is charged negatively, or "low". The resistor $R_8$ connected to the output of gate 56 then provides a charge path to a supply voltage, not shown. Capacitor $C_1$ begins to charge this voltage, and again the voltage approaches and passes through the threshold voltage point of gate 56. The circuit again changes state — the output of gate 56 becomes "low", and that of gate 58, "high", and the cycle repeats. The series of COUNT pulses generated by the clock and appearing on the output terminal of gate 58 is applied by way of line 40 to the counter 22.

The digital-to-analog converter section of FIG. 2 is of the well-known resistor-ladder network variety. It should be noted that the actual converter configuration employed need not be of this type and the invention is not limited to its use. However, the resistor-ladder network, although it requires more components than the weighted-resistor type D/A network in which a single resistor is used for each output, possess certain advantages. The most significant advantage of the resistor-ladder network is that it can be constructed with only two resistor values, namely "R" and "2R". Since the magnitudes of the resistors are not more than a factor of two apart, and since all the resistors can be made at the same time with the same tools and materials, resistor-ladder networks of 0.025 percent are readily available. Actually, ladder resistances of the order of ± 1 percent are adequate in the system of FIG. 2 for up to 14 bits of D/A capability. The latter are relatively easy to manufacture and are therefor reasonably low in cost. A question arises as to the required accuracy and stability of the digital-to-analog converter. In anomaly-type magnetometer systems which characteristically employ wide dc input range tolerant detectors, the design of the converter may be relaxed significantly. This is so because the nulling voltage feedback need not accurately represent the applied ambient field and the analog dc null level need not precisely match any reference level. It is significant to note that in the present system, resolution may greatly exceed accuracy without system detriment. In other words, the actual binary digital count does not have to correspond to a specific predetermined analog output voltage. The easing of the resolution constraint makes the digital nulling scheme practical from the standpoint of component count and cost.

In designing the D/A converter, the two criteria to be considered are that the largest positive bit-to-bit analog voltage change must be no larger than the analog value to the least significant bit (which represents the specified maximum deviation from the reference voltage exceptable for the sensor amplifier output following a null cycle); and that the analog value for the full binary count is sufficient to handle the system's dynamic range considerations.

In operation, the D/A converter section accepts as an input on line 40 digital clock pulses which cycle an "N" stage ripple counter 22, typically comprised of a plurality of bistable flip-flop circuits. The counter 22 provides a parallel-binary output signal of "N" bits. Each flip-flop in effect, has its output coupled to a resistor in the ladder network 24 and depending upon its bistable state, causes either of two voltage potentials (for example, the supply voltage or ground potential) to be applied to the corresponding resistor. The output of the ladder network, $V_L$, appearing on line 42 is applied to the plus (+) terminal of operational amplifier 26. The output terminal of this amplifier is connected directly to the minus (−) input thereof, whereby the amplifier becomes a non-inverting gain-of-one voltage amplifier for the signal applied to its plus (+) terminal, and provides very high input impedance and very low output impedance. The output of amplifier 26, manely $V_{NULL}$, is applied to the minus (−) terminal of sensor amplifier 12 where it functions as negative voltage feedback with respect to the sensor output.

Figure 6:
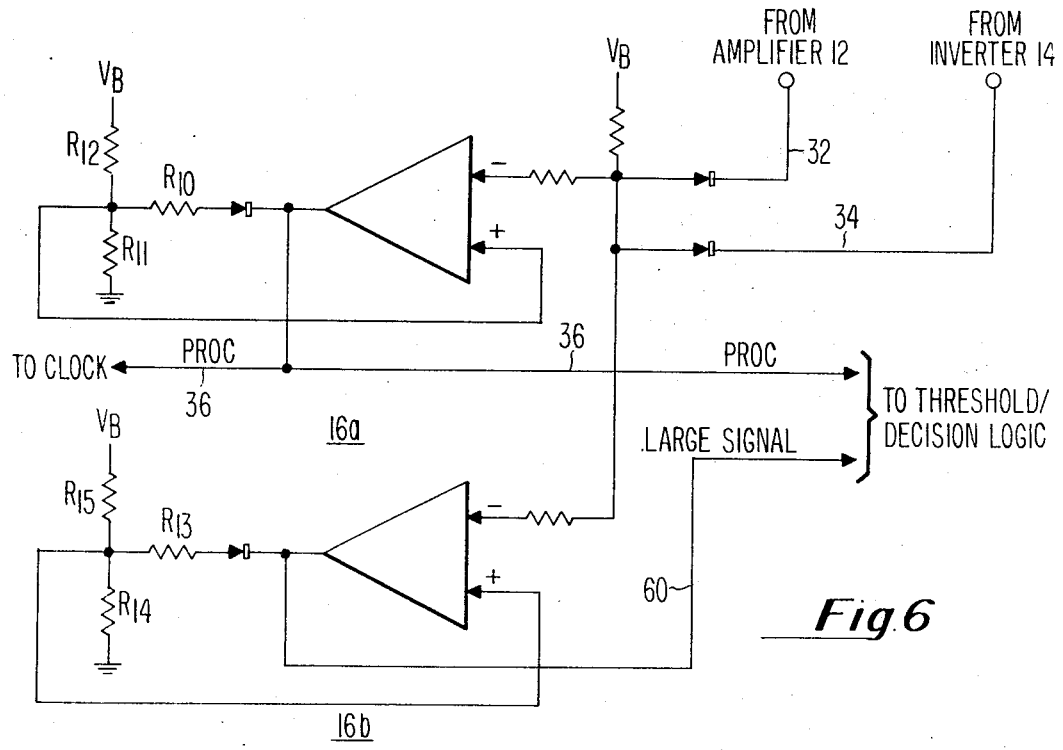
FIG. 6 illustrates the use of a plurality of the comparator circuits depicted in FIG. 3 to obtain signal amplitude information.

FIG. 6 illustrates a means of providing signal amplitude information in the system of FIG. 2. Such information stems from the use of two or more comparator circuits of the type depicted in FIG. 3. Thus, in FIG. 6, there are depicted two comparators, 16a and 16b. Comparator 16a functions as the single comparator 16 of FIG. 3 described hereinbefore, although its allowable signal deviation level may be narrowed to ±0.5 volts from ±4.0 volts, by selection of the resistance values for the divider network resistors, $R_4$, $R_5$ and $R_6$. Comparator 16b is set with a larger allowable deviation level of about ±4 volts. This is accomplished in FIG. 6 by making the resistance of $R_{10}$ larger than that of $R_{13}$; $R_{11}$ equal to $R_{14}$, and $R_{12}$ equal to $R_{15}$.

In operation, comparator 16a will hold the sensor amplifier 12 output voltage to within ±0.5 volts of reference except when a signal is being processed. If the signal being processed is of sufficient magnitude to cause the amplifier 12 output voltage to deviate more than ±4 volts, comparator 16b will be activated and a signal on line 60 will be transmitted to the Threshold/Decision Logic section 28 to indicate such occurrence. The action taken by the Threshold/Decision Logic will depend upon the specific system application. For example, in a traffic control situation, the LARGE SIGNAL level indication could be used to distinguish between the signal output of the sensor 10 caused by an automobile and that caused by a motorcycle. During the signal processing, the Threshold/Decision Logic 28 applies a HOLD signal to line 38 to inhibit the generation of clock pulses (refer to FIG. 5). After the Threshold/Deciison Logic section has taken appropriate action, the HOLD signal is terminated and a renull cycle is initiated. Completion of the cycle results in the resetting of both comparators 16a and 16b.

From the foregoing description of the invention, it should be apparent that the present digital ambient nulling system provides an efficient and reliable means for cancellation of unwanted steady-state magnetic effects. The embodiment of the invention described herein is that of a successfully operative system. However, it should be understood that changes and modifications of the described arrangements may be needed to fit particular operating requirements. These changes and modifications, insofar as they are not departures from the true scope of the present invention, are intended to be covered by the claims appended hereto.

What is claimed is:

1. A digital ambient nulling system for use with a magnetometer sensor comprising in combination sensor amplifier means having a pair of input terminals and an output terminal, means coupling the output signals from said sensor to one of said sensor amplifier input terminals, inverter amplifier means having a pair of input terminals and an output terminal, means coupling the output terminal of said sensor amplifier means to one of the input terminals of said inverter amplifier means, the other input terminal of said inverter amplifier means being coupled to a source of reference potential, comparator amplifier means having first and second input terminals and an output terminal, means coupling the output terminals of said sensor amplifier means and said inverter amplifier means in common to said first input terminal of said comparator amplifier means, said comparator amplifier means being capable of assuming either of two operational states and being switched from one state to the other state in response to the signal levels appearing on said first input terminal, the voltage levels appearing on said output terminal of said comparator amplifier means being a function respectively of said operational states, circuit network divider means coupled to said output terminal of said comparator amplifier means and being responsive to said voltage levels appearing thereon for providing respective predetermined reference voltage levels on said second input terminal of said comparator amplifier means, digital-to-analog converter means including a counter, said converter means generating null voltage proportional to the instantaneous count accumulated in said counter, clock means operatively connected to said output terminal of said comparator amplifier means and to said counter, said clock means supplying count pulses to said counter whenever said comparator amplifier means is in a predetermined one of its operational states, null voltage amplifier means operatively connected for feeding-back said null voltage output of said digital-to-analog converter means to the other input terminal of said sensor amplifier means, whereby the effects of the steady state magnetic fields which coexist with the time-varying fields of interest are cancelled from the sensor output signals.

2. A digital ambient nulling system as defined in claim 1 wherein said counter is a binary ripple counter having a plurality of stages, said digital-to-analog converter means further including a resistance ladder network and means for coupling said counter stages to respective resistance members of said network, said clock means supplying count pulses to said ripple counter, the latter accumulating said count during any null cycle and storing said count subsequent thereto, said resistance ladder network having an output terminal upon which said null voltages appear.

3. A digital ambient nulling system as defined in claim 2 wherein said means coupling the output terminals of said sensor amplifier means and said inverter amplifier means to said first input terminal of said comparator amplifier means comprise a pair of diodes each having first and second electrodes, the first electrodes of said diodes being connected respectively to said output terminals of said sensor amplifier means and said inverter amplifier means, the second electrodes of said diodes being connected to a common point, first and second resistors and a source of supply potential, said first and second resistors connecting said common point respectively to said first input terminal of said comparator amplifier means and to said source of supply potential.

4. A digital ambient nulling system as defined in claim 3 wherein said circuit network divider means comprises a third diode and third, fourth and fifth resistors, said third and fourth resistors being connected in series relationship between said source of supply potential and ground, said fifth resistor and said diode being connected in series relationship between the common point of the voltage divider formed by said third and fourth resistors and said output terminal of said comparator amplifier means, said voltage divider common point being connected to said second input terminal of said comparator amplifier means.

5. A digital ambient nulling system as defined in claim 4 further including threshold/decision logic means coupled to receive and to process the signal information appearing respectively on the output terminals of said sensor amplifier means, said inverter amplifier means, and said comparator amplifier means, and for providing command signals to said clock means.

6. A digital ambient nulling system as defined in claim 5 further including second comparator amplifier means having first and second input terminals and an output terminal, means coupling said first input terminal of said second amplifier comparator means to said common point of said pair of diodes, said second amplifier comparator means being capable of being switched to either of two operational states in response to the signal level appearing on said first input terminal thereof, the voltage levels appearing on said output terminal thereof being a function respectively of said operational states, second circuit network divider means coupled to said output terminal of said second comparator amplifier means and being responsive to said voltage levels appearing thereon for providing predetermined respective corresponding voltage levels to said second input terminal of said second comparator amplifier means, the respective switching levels for said first and second comparator amplifier means being dissimilar and being a function of the circuit divider networks associated respectively therewith, and means coupling the output terminal of said second comparator amplifier means to said threshold/decision logic means.

7. A digital ambient nulling system as defined in claim 5 wherein said clock means comprise first, second and third NOR gates each having a pair of input terminals and an output terminal, means coupling the output terminal of said comparator amplifier means to an input terminal of said first NOR gate, the other input terminal of said first NOR gate being returned to ground, means coupling the output terminals of said first and second NOR gates to the respective input terminals of said third NOR gate, a first resistive element and a capacitive element connected in series and coupling the output terminal of said third NOR gate to an input terminal of said second NOR gate, a second resistive element connected between the first resistive element/capacitive element common connection and the output terminal of said second NOR gate, the other input terminal of said second NOR gate being coupled to said threshold/decision logic means, said count pulses applied to said counter appearing on the output terminal of said third NOR gate.

8. A digital ambient nulling system as defined in claim 7 further including a reset circuit, said reset circuit comprising a fourth NOR gate and a transistor, said fourth NOR gate having a pair of input terminals and an output terminal, said transistor having base, emitter and collector electrodes, level shifting means coupling the output terminal of said sensor amplifier means to one of the input terminals of said fourth NOR gate, means coupling the signal appearing on the output terminal of said first NOR gate of said clock means to the other input terminal of said fourth NOR gate, the output terminal of said fourth NOR gate being coupled to the base electrode of said transistor, the collector electrode of said transistor being connected to said source of supply potential, impedance means coupling the emitter electrode of said transistor to ground, and means coupling the emitter electrode of said transistor to said counter.

* * * * *

PO-1050
(5/69)

UNITED STATES PATENT OFFICE
CERTIFICATE OF CORRECTION

Patent No. 3,697,870          Dated October 10, 1972

Inventor(s) Leonard C. Brenner

It is certified that error appears in the above-identified patent and that said Letters Patent are hereby corrected as shown below:

Column 7, line 46 "PROC" should read --$\overline{PROC}$-- ;
column 7, line 50, "PROC" should read --$\overline{PROC}$-- .
Column 8, line 18, "PROC" should read --$\overline{PROC}$-- .

Signed and sealed this 29th day of May 1973.

(SEAL)
Attest:

EDWARD M. FLETCHER, JR.                ROBERT GOTTSCHALK
Attesting Officer                      Commissioner of Patents